United States Patent
Vyshetsky et al.

(10) Patent No.: US 9,208,108 B2
(45) Date of Patent: Dec. 8, 2015

(54) METHOD AND SYSTEM FOR IMPROVED FLASH CONTROLLER COMMANDS SELECTION

(75) Inventors: Dmitry Vyshetsky, Cupertino, CA (US); Howard Tsai, Cupertino, CA (US); Paul Gyugyi, Sunnyvale, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 977 days.

(21) Appl. No.: 12/340,380

(22) Filed: Dec. 19, 2008

(65) Prior Publication Data
US 2010/0161941 A1    Jun. 24, 2010

(51) Int. Cl.
G06F 9/30    (2006.01)
G06F 13/16    (2006.01)
G06F 9/38    (2006.01)

(52) U.S. Cl.
CPC .............. *G06F 13/1605* (2013.01); *G06F 9/38* (2013.01)

(58) Field of Classification Search
None
See application file for complete search history.

(56) References Cited

U.S. PATENT DOCUMENTS

| | | | |
|---|---|---|---|
| 4,360,916 A | 11/1982 | Kustedjo et al. | |
| 5,343,481 A | 8/1994 | Kraft | |
| 5,533,035 A | 7/1996 | Saxena et al. | |
| 5,603,001 A | 2/1997 | Sukegawa et al. | |
| 5,734,926 A | 3/1998 | Feeley et al. | |
| 5,787,279 A | 7/1998 | Rigoutsos | |
| 5,878,279 A | 3/1999 | Athenes | |
| 6,000,006 A | 12/1999 | Bruce et al. | |
| 6,119,196 A * | 9/2000 | Muller et al. | 710/243 |
| 6,222,144 B1 | 4/2001 | Nishikawa | |
| 6,223,144 B1 | 4/2001 | Barnett | |
| 6,636,940 B1 | 10/2003 | Hodges | |
| 6,760,743 B1 * | 7/2004 | Heddes et al. | 718/100 |
| 6,772,276 B2 * | 8/2004 | Dover | 711/103 |
| 6,985,977 B2 | 1/2006 | Vrancic | |
| 7,100,103 B2 | 8/2006 | Mizrachi et al. | |

(Continued)

FOREIGN PATENT DOCUMENTS

| | | |
|---|---|---|
| EP | 0502211 | 9/1992 |
| EP | 1271332 A2 | 1/2003 |

(Continued)

OTHER PUBLICATIONS

"8237A High Performance Programmable DMA Controller", datasheet by Intel, Oct. 1989.

(Continued)

*Primary Examiner* — Jacob Petranek (57) ABSTRACT

A system for selecting a subset of issued flash storage commands to improve processing time for command execution. A plurality of ports stores a first plurality of command identifiers and are associated with the plurality of ports. Each of the first plurality of arbiters selects an oldest command identifier among command identifiers within each corresponding port resulting in a second plurality of command identifiers. A second arbiter makes a plurality of selections from the second plurality of command identifiers based on command identifier age and the priority of the port. A session identifier queue stores commands associated with the plurality of selections among other commands forming a third plurality of commands. A microcontroller selects an executable command from the third plurality of commands for execution based on an execution optimization heuristic. After execution of the command, the command identifier in the port is cleared.

21 Claims, 3 Drawing Sheets

(56) References Cited

U.S. PATENT DOCUMENTS

| | | | |
|---|---|---|---|
| 7,237,016 B1 * | 6/2007 | Schober | 709/223 |
| 7,386,683 B2 | 6/2008 | Blumrich et al. | |
| 7,392,330 B2 | 6/2008 | Weatherspoon | |
| 7,454,546 B1 * | 11/2008 | Lilley | 710/243 |
| 7,457,897 B1 | 11/2008 | Lee et al. | |
| 7,603,523 B2 | 10/2009 | Blumrich et al. | |
| 7,689,998 B1 * | 3/2010 | Chrysanthakopoulos | 718/104 |
| 7,761,636 B2 * | 7/2010 | Mott et al. | 710/240 |
| 7,877,524 B1 | 1/2011 | Annem et al. | |
| 7,979,615 B1 * | 7/2011 | Spitzer | 710/107 |
| 8,103,836 B2 | 1/2012 | Blumrich et al. | |
| 8,108,590 B2 | 1/2012 | Chow et al. | |
| 8,694,750 B2 | 4/2014 | Vyshetsky et al. | |
| 8,732,350 B2 | 5/2014 | Vyshetski et al. | |
| 2002/0078270 A1 | 6/2002 | Hofstee et al. | |
| 2002/0161941 A1 | 10/2002 | Chue et al. | |
| 2003/0172147 A1 | 9/2003 | Chang | |
| 2004/0044811 A1 | 3/2004 | Vrancic | |
| 2004/0186946 A1 | 9/2004 | Lee | |
| 2005/0057973 A1 | 3/2005 | Khatami et al. | |
| 2005/0097182 A1 | 5/2005 | Bishop et al. | |
| 2005/0097183 A1 | 5/2005 | Westrelin | |
| 2005/0160200 A1 | 7/2005 | Saito | |
| 2005/0289253 A1 | 12/2005 | Edirisooriya et al. | |
| 2006/0004931 A1 | 1/2006 | Weatherspoon | |
| 2006/0075395 A1 | 4/2006 | Lee et al. | |
| 2006/0136570 A1 | 6/2006 | Pandya | |
| 2006/0152981 A1 * | 7/2006 | Ryu | 365/194 |
| 2006/0236039 A1 | 10/2006 | Golander | |
| 2007/0073920 A1 | 3/2007 | Wu et al. | |
| 2007/0174495 A1 | 7/2007 | Tung | |
| 2008/0034153 A1 | 2/2008 | Lee et al. | |
| 2008/0126684 A1 | 5/2008 | Wu et al. | |
| 2008/0140910 A1 | 6/2008 | Flynn et al. | |
| 2008/0250195 A1 | 10/2008 | Chow et al. | |
| 2008/0270681 A1 | 10/2008 | Van Acht et al. | |
| 2009/0002761 A1 | 1/2009 | La et al. | |
| 2009/0070520 A1 | 3/2009 | Mizushima | |
| 2009/0100307 A1 | 4/2009 | Lee | |
| 2009/0150605 A1 | 6/2009 | Flynn et al. | |
| 2009/0287876 A1 | 11/2009 | Yeh | |
| 2009/0300318 A1 | 12/2009 | Allen et al. | |
| 2010/0268864 A1 | 10/2010 | Mothilal | |
| 2011/0055668 A1 | 3/2011 | Kim et al. | |
| 2011/0131354 A1 | 6/2011 | Smith | |

FOREIGN PATENT DOCUMENTS

| | | |
|---|---|---|
| EP | 1271332 | 2/2003 |
| EP | 1840722 A2 | 10/2007 |
| JP | 2004110436 | 4/2004 |
| JP | 2004110438 A2 | 4/2004 |
| JP | 2007034581 A2 | 2/2007 |
| JP | 2008158991 | 7/2008 |

OTHER PUBLICATIONS

"Wikipediia-Micrcontroller" article found on http://web.archive.org from Nov. 27, 2007.
"Express Apps-PEX 8311", by PLX Technology, Jan. 2006.
Advanced Semiconductor Memories Architecture, Designs, and Applications, Ashok Sharma, IEEE Press, 2003, at 393-401.
"Gupta, A. et al.: DFTL: A Flash Translation Layer Employing Demand -based Selective Caching of Page-level1 Address Mappings. In: Proceedings of the 14th international conference on Architectural support for programming languages and operating systems, ASPLOS '09, Mar. 7-11, 2009, Washington, DC, USA. pp. 229-240".

* cited by examiner

METHOD AND SYSTEM FOR IMPROVED FLASH CONTROLLER COMMANDS SELECTION

TECHNICAL FIELD

Embodiments of the present invention relate to the field of electronics. More particularly, embodiments of the present invention relate to a method and system for optimizing execution of flash controller commands to improve processing efficiency of a microcontroller.

BACKGROUND ART

Multiple flash storage commands may be simultaneously issued to flash firmware for execution. For example, hundreds of commands may be issued for execution at the same time. In general, flash storage commands may have complementary parameters, e.g., consecutive logical block addresses, independent flash locations, etc., that can be executed in parallel to improve system efficiency. Intelligent flash command ordering can therefore improve system efficiency.

Unfortunately, examining hundreds of issued flash commands is memory intensive and time consuming. Firmware generally does not have sufficient resources to examine all the issued flash commands at once.

One conventional system processes the issued commands in the order they are issued/received. Unfortunately, processing commands in the order they were issued/received may lead to inefficiencies within the system. For example, processing a command that is resource intensive, e.g., computationally intensive, with a few dependent commands instead of processing a command that is not resource intensive but does have multiple dependent commands may lead to inefficient command execution.

In one conventional system, a firmware may be equipped with limited reordering capability. For example, a number of commands may be reordered to improve system efficiency. Unfortunately, limited reordering may lead to unfair processing of commands. For example, limited command reordering may lead to execution of a newly loaded command from one port while many other older commands from other ports are allowed to languish. Therefore, limited command reordering may lead to command execution in an unfair manner.

SUMMARY

Accordingly, a need has arisen to select a subset of issued flash storage commands for efficient examination and reordering thereof in order to improve the overall performance of an electronic system. A need has further arisen to select issued flash commands in a fair and efficient manner. It will become apparent to those skilled in the art in view of the detailed description of the present invention that the embodiments of the present invention remedy the above mentioned needs and provide the above referenced advantages.

According to one embodiment, a plurality of ports, e.g., 8 ports, may store a first plurality of command identifiers, e.g., 32 command identifiers per port. The command identifiers are associated with the issued flash storage commands to firmware. The issued flash storage commands are stored in a memory component. Each port may have a corresponding arbiter. The memory component can therefore store up to 256 issued flash commands at any time.

Each port arbiter may select one of the command identifiers stored in its corresponding port memory. According to one embodiment, the selected command identifier is the oldest command identifier compared to the other command identifiers within the same port. For example, the selected command identifier may be the command identifier that has been stored in the port longer than any other command identifier within the same port. Selection of command identifiers by the port arbiters results in the selection of a first subset of command identifiers.

A second arbiter selects a second subset of command identifiers from the first subset of command identifiers. It is appreciated that in one embodiment, the second subset of command identifiers are similarly selected based on the age of the command identifiers of the first subset. For example, the two oldest command identifiers of the first subset may be selected. It is appreciated that the second subset of command identifiers may be selected based on the priority of the ports. For example, a first command identifier from a first port that has a higher priority in comparison to a second command identifier from a second port may be selected.

The second subset of command identifiers are provided to an instruction fetch unit. The instruction fetch unit may fetch the commands associated with the command identifiers. The fetched commands corresponding to the second subset of command identifiers are stored in a session identifier (ID) memory queue. The session ID memory queue may also comprise commands from previous fetches that have not yet been executed.

A microcontroller selects at least one of the commands from the session ID queue for execution. It is appreciated that the selection of the command by the microcontroller may be based on optimization heuristics in order to improve the execution efficiency of the system. Any of a number of well known optimization processes can be used. The selected command may then be executed by the microcontroller. As a result, the executed command causes its corresponding command in the session ID to be cleared. Furthermore, the microcontroller may also clear the corresponding command identifier stored in the associated port, thereby allowing a new command identifier to be stored in the port to replace the cleared command identifier.

Accordingly, a preliminary selection of command identifiers based on their age and further based on port priority improves efficiency of the system as a whole by reducing the number of commands needed to be scanned during optimization while maintaining the fairness of command execution between the various ports. Moreover, reducing the number of commands that are examined and considered by the microcontroller during optimization is advantageous especially for firmware with limited resources. Reordering of the commands from the selected subset during optimization improves system efficiency.

More particularly, a system for selecting a subset of issued flash storage commands includes a plurality of ports having memory operable to store a first plurality of command identifiers. A first plurality of arbiters are associated with the plurality of ports, wherein each of the first plurality of arbiters is operable to select an oldest command identifier among command identifiers within each corresponding port, wherein selection of the oldest command identifier in all ports results in a second plurality of command identifiers. A second arbiter is operable to make a plurality of selections from the second plurality of command identifiers, wherein one of the plurality of selections is based on an oldest command identifier among the second plurality of command identifiers.

An instruction fetch unit may be used to fetch commands corresponding to the plurality of selections made by the second arbiter. A session identifier (ID) queue is operable to store commands associated with the plurality of selections to form a third plurality of commands. A microcontroller is operable to select an executable command from the third plurality of commands based on an execution optimization heuristic.

It is appreciated that the plurality of command identifiers selection may be further based on a priority of the plurality of ports. In response to a command being executed, the microcontroller clears the executable command from the session ID queue. Moreover, the microcontroller after executing the executable command may cause a command identifier associated with the executed command to be cleared from its associated port. As such, the port may store a new command identifier to replace the command identifier associated with the executed command.

BRIEF DESCRIPTION OF THE DRAWINGS

Embodiments of the present invention are illustrated by way of example, and not by way of limitation, in the figures of the accompanying drawings and in which like reference numerals refer to similar elements and in which.

DETAILED DESCRIPTION

Reference will now be made in detail to embodiments of the present invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be evident to one of ordinary skill in the art that the present invention may be practiced without these specific details. In other instances, well known methods, procedures, components, and circuits have not been described in detail as not to unnecessarily obscure aspects of the invention.

Notation and Nomenclature

Some portions of the detailed descriptions which follow are presented in terms of procedures, steps, logic blocks, processing, and other symbolic representations of operations on data bits that can be performed on television set memory. These descriptions and representations are the means used by those skilled in the art to most effectively convey the substance of their work to others skilled in the art. A procedure, a microcontroller set executed step, logic block, process, etc., is here, and generally, conceived to be a self-consistent sequence of steps or instructions leading to a desired result. The steps are those requiring physical manipulations of physical quantities.

Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "creating" or "transferring" or "executing" or "determining" or "instructing" or "issuing" or "clearing" or "accessing" or "aggregating" or "obtaining" "fetching" or "selecting" or "calculating" or "measuring" or "querying" or "receiving" or "sending" or "providing" or "storing" or "displaying" or "rendering" or the like, refer to the action and processes of a television set, or similar electronic computing device, that manipulates and transforms data represented as physical (electronic) quantities within the television set's registers and memories into other data similarly represented as physical quantities within the television set memories or registers or other such information storage, transmission or display devices.

A Method and System for Improved Flash Controller Commands Selection

Figure 1:
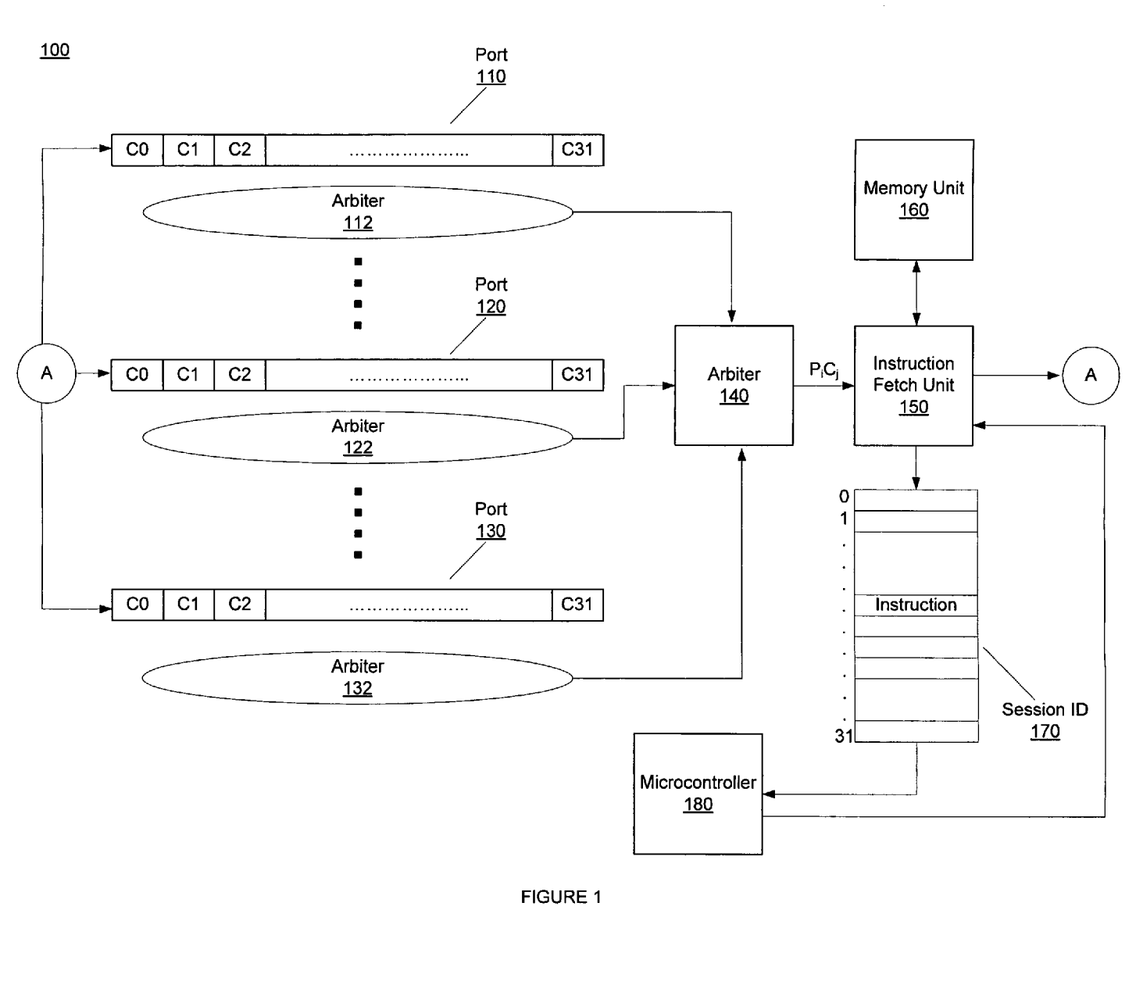
FIG. 1 shows an exemplary system in accordance with embodiments of the present invention.

Referring now to FIG. 1, an exemplary system 100 in accordance with embodiments of the present invention is shown. The system 100 includes a plurality of ports and a plurality of associated arbiters. For example, the system 100 includes ports 110, 120 and 130. Each port has a memory for storing command identifiers and has a corresponding arbiter, e.g., arbiter 112, 122 and 132. Arbiters 112, 122 and 132 are coupled to secondary arbiter 140. Arbiter 140 is coupled to an instruction fetch unit 150 that is coupled to a memory unit 160 and a session identifier (ID) queue 170. A microcontroller 180 may be coupled to the session ID queue 170 and the instruction fetch unit 150.

Each port, e.g., ports 110, 120 and 130, may store a number of command identifiers, e.g., C0, C1, C2, etc. The command identifiers are associated with flash storage commands that have been issued to firmware for execution. In one exemplary embodiment, each port stores up to 32 command identifiers, but this number of command identifiers is exemplary and not intended to limit the scope of the present invention.

It is appreciated that any number of ports and arbiters may be used and the values of FIG. 1 are exemplary. In one exemplary embodiment 8 ports and 8 associated arbiters provide 256 possible issued command identifiers assuming each port stores 32 command identifiers issued to firmware of a flash storage device.

A subset of commands is selected for execution processing instead of processing all the issued command at the same time. Processing a smaller subset of commands via optimization heuristics is advantageous because processing 256 issued commands to determine an optimum order of command execution can be inefficient due to limited resources, e.g., memory. As such, in accordance with embodiments of the present invention, a smaller subset of issued commands are first selected in order to optimize the execution ordering of the issued commands. It is appreciated that fairness between command selections is also maintained. For example, it is inherently unfair to select a command for execution that is fairly recent over other commands that have been queued up for a long time except in extraordinary circumstances, e.g., a command from a port with a higher priority. Accordingly, a selection process in accordance with embodiments of the present invention has been developed to select a smaller subset of commands based on command age while allowing other optimization parameters to be applied to the subset for execution ordering.

According to one embodiment, each of the arbiters 112, 122 and 132 select the oldest command identifier from their respective ports, e.g., ports 110, 120 and 130 respectively. The oldest command identifier in each port is the command identifier that has been loaded into the port prior to other command identifiers within the same port. It is appreciated that a command identifier may be selected randomly when more than one command identifier have the same age, e.g., loaded at the same time. Selecting the oldest command identifier from each port ensures that the oldest commands associated with the oldest command identifiers maintain a level of fairness between command identifiers from the same port.

The selected command identifier by each arbiter, e.g., arbiters 112, 122 and 132, form a plurality of command identifiers and are transmitted to the secondary arbiter 140. For example, a total of 8 command identifiers may form this plurality, one command identifier being selected by each arbiter of each port, when there are 8 ports present. The secondary arbiter 140 receives the command identifiers and selects at least one or more of the command identifiers. For example, the arbiter 140 may select a command identifier based on its age and/or based on port priority of the associated port that a command identifier belongs to or any combination thereof.

Selecting a command identifier between different ports based on their age again ensures that the oldest command identifier is elevated for execution prior to a new command associated with its new command identifier. As a result, a level of fairness again is maintained between command identifiers from different ports. Furthermore, selecting a command identifier based on the priority of the port ensures that a command identifier with higher priority be selected and its associated command be executed before other commands with lower priority. It is appreciated that a selection of a command identifier based on a combination of the age of the command identifier and the priority of the port strikes a balance between fairness and port priority.

The one or more command identifiers selected by the secondary arbiter 140, e.g., $P_iC_j$, are transmitted to the instruction fetch unit 150. The instruction fetch unit 150 fetches the command associated with the selected command identifier. The commands associated with command identifiers are stored in the memory unit 160.

The instruction fetch unit 150 transmits the fetched commands to the session ID memory 170 provided there is vacancy. According to one embodiment, fetching a command may require multiple dependent memory accesses. As such, pipelining may be utilized to fetch multiple commands in parallel to hide the latency of the dependent memory accesses.

The session ID memory 170 stores the fetched commands. It is appreciated that the session ID memory 170 may also contain commands that have been fetched prior to the recent fetch but remain to be executed. It is appreciated that for increased efficiency, commands may be placed in the session ID memory 170 and presented to the firmware out of order. The order that commands are taken off of the session ID memory 170 is based on an execution optimization heuristic that can be quite complex and require scanning all commands in the memory 170. Any well known heuristic can be used to optimize processing efficiency based on the execution order. It is appreciated that embodiments of the present invention reduce processing complexity of this heuristic by limiting the number of commands that must be considered, e.g., to 32 from a potential of 256, in this example. In this exemplary embodiment, the session ID memory 170 stores 32 commands. This number, however, is exemplary and not intended to limit the scope of the present invention.

The microcontroller 180 selects a command for execution based on the selection heuristic employed. The command is selected from those commands stored in the session ID memory 170. It is appreciated that the microcontroller may select more than one command for parallel processing and execution. As such, the selection of one command for execution is exemplary and not intended to limit the scope of the present invention. The selection of the command may be based on various factors, e.g., optimization of command execution or reducing execution time, etc. It is appreciated that initially selecting a subset of issued commands, e.g., 32 commands, and subsequently applying execution ordering processing to the subset of commands instead of the entire set of issued commands, e.g., 256 commands, provide a more efficient, less resource intensive and faster system given firmware limited resources, e.g., memory. Accordingly, the microcontroller 180 selects at least one or more of the commands in the session ID memory 170 to be executed.

After executing the selected commands, the microcontroller 180 causes the executed command to be cleared from the session ID memory 170. The microcontroller 180 may notify the instruction fetch unit 150 that the selected command has been executed. As a result, the command identifier associated with the executed command may be cleared from the port that stores that command identifier. In one embodiment, the next command identifier may now be loaded into the port where the command identifier associated with the executed command has been cleared.

The above process may be repeated until all the issued commands are selected, processed and executed in a timely fashion. According, a constant stream of command identifiers are repeatedly selected to form a subset of command identifiers. The commands associated with the subset of command identifiers are fetched and processed by the microcontroller to determine the order of their execution. As such, a subset of commands are being execution ordering processed at the same time instead of all the issued commands, thereby improving efficiency of limited resource firmware. The selection of a subset of commands according to embodiments of the present invention balances a tradeoff between execution optimization and fairness between commands from different ports. Moreover, command reordering, command execution and subset selection described above allows multiple commands to be pipelined and/or executed simultaneously on independent hardware systems. As such, full performance of a flash may be achieved.

Figure 2:
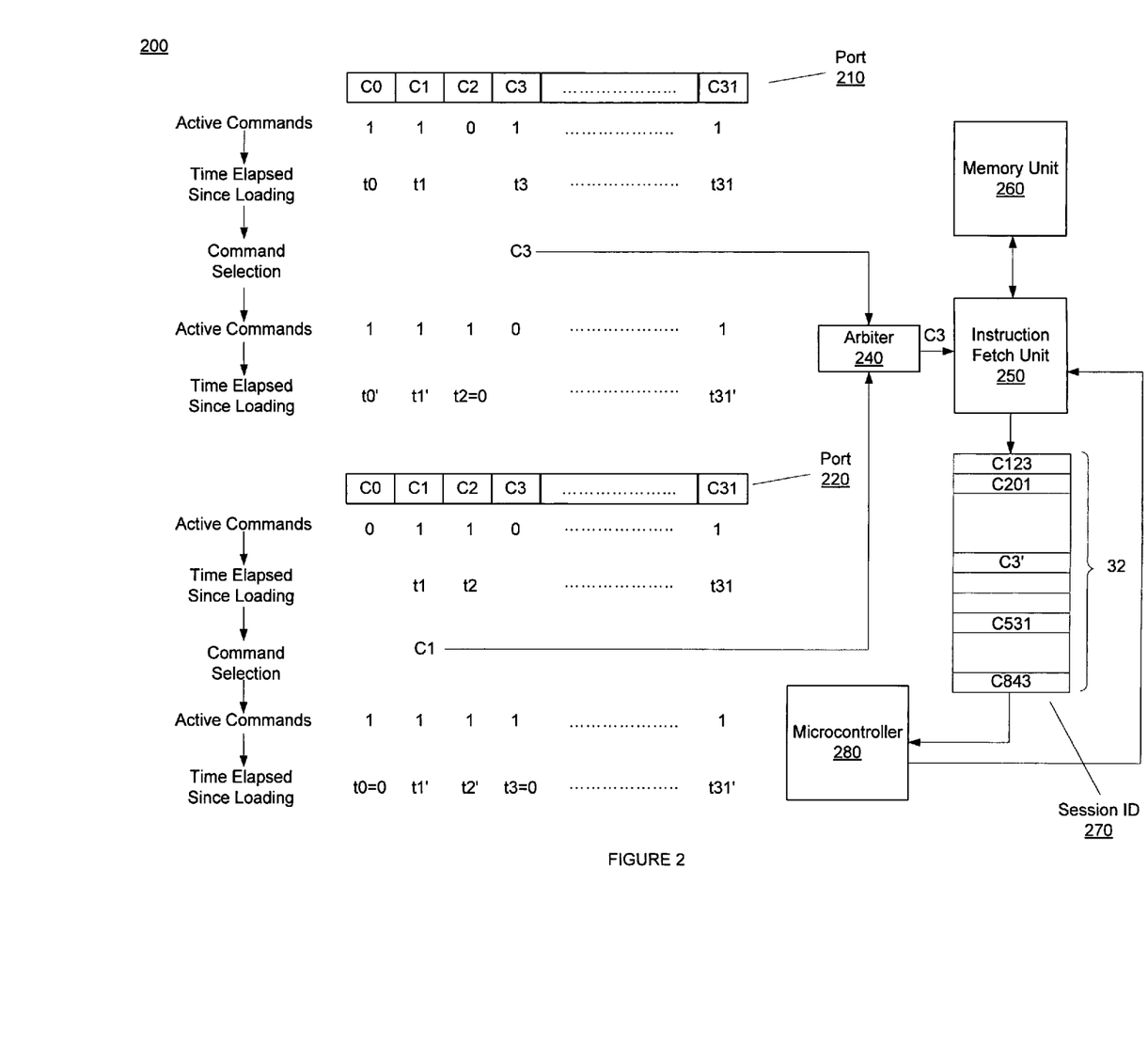
FIG. 2 shows an exemplary operation of a system in accordance with one embodiment of the present invention.

Referring now to FIG. 2, an exemplary operation of system 200 in accordance with one embodiment of the present invention is shown. The system 200 includes port 210 and port 220. It is appreciated that the operation of the two port system, as shown, is exemplary only and not intended to limit the scope of the present invention.

As described above with respect to FIG. 1, each port has an associated arbiter associated. Each port may store a command identifier that is associated with an issued flash storage command to firmware. An active command or bit is also associated with each command identifier that corresponds to an issued command that has not been executed by a microcontroller 280. For example, an active bit command may be asserted, e.g., 1, for a command that has been issued but not yet executed by the microcontroller 280.

In this exemplary embodiment, the command identifier C0 for port 210 has an active command bit equal to 1 indicating that the command associated with the command identifier C0 has not been executed yet. Similarly, command identifiers C1, C3 and C31 have active command bits indicating that their associated commands have not yet been executed. In contrast, the active command for the command identifier C2 is not asserted, indicating that the command associated with the command identifier C2 has already been executed by the microcontroller 280 and the slot is vacant. In port 220, the command identifiers C1, C2 and C31 are asserted to indicate that their associated commands have not been executed by the microcontroller 280. On the other hand, the command identifiers C0 and C3 are not asserted to indicate that their respective commands have been executed by the microcontroller 280 and these slots are now vacant.

It is appreciated that the age of each of the issued commands and their respective command identifiers that have not been executed by the microcontroller 280 is measured. For example, the amount of time elapsed since loading the issued commands associated with command identifiers C0, C1, C3 and C31 of port 210 is measured. For example, command identifiers C0, C1, C3 and C31 of port 210 have elapsed times of t0, t1, t3 and t31 respectively. Similarly, the amount of time elapsed since loading the issued commands associated with command identifier C1, C2 and C31 of port 220 is measured. For example, command identifiers C1, C2 and C31 of port 220 have elapsed times of t1, t2 and t31 respectively.

As described above with respect to FIG. 1, the arbiter associated with each port 210 and 220 selects the oldest command identifier that is still active, hence not executed by the microcontroller 280. For example, the arbiter associated with the port 210 may select the command identifier C3 if the elapsed time since its issuance, e.g., loading, for its corresponding command is greater than other active command identifiers and their associated commands. In other words, the command identifier C3 is selected if its elapsed time t3 is greater than t0, t1 and t31. Accordingly, the oldest command identifier is selected to maintain fairness of execution between commands within the same port. Similarly, the command identifier C1 from port 220 may be selected by its corresponding arbiter. In other words, C1 from port 220 is selected when its elapsed time t1 is greater than the elapsed time of other command identifiers not yet executed by the microcontroller, e.g., t2 and t31.

Accordingly, the selected command identifiers C3 from port 210 and C1 from port 220 are transmitted to the secondary arbiter 240. The secondary arbiter 240 may now select between the two command identifiers, e.g., C3 of port 210 and C1 of port 220. The selection by the arbiter 240 may be based on the age of each of the issued commands associated with their command identifiers. Moreover, the selection by the arbiter 240 may be based on the priority of the port associated with each of the command identifiers. It is appreciated that the selection by the arbiter 240 may be based on a combination of the priority of the port and the age of the command.

In this exemplary embodiment, the selection by the secondary arbiter 240 may be based on the age of the command. Accordingly, the command identifier C3 of port 210 may be selected when its elapsed time t3 is greater than the elapsed time t1 of the command identifier C1 of port 220. It is appreciated, however, that the selected command identifier may be the same or different if the selection process is based on other criteria, e.g., port priority, combination of port priority and the age of the command, etc. As such, the selection of the command identifier based on the age of the command is exemplary and it is not intended to limit the scope of the present invention.

Accordingly, the secondary arbiter 240 may select the command identifier C3 from port 210. An instruction fetch unit 250 receives the selection, e.g., C3, of the secondary arbiter 240. In response to receiving the command identifier C3 selection, the instruction fetch unit 250 fetches the complete command syntax associated with the command identifier C3 of port 210 from memory 260. According to one embodiment, fetching a complete command format may require multiple dependent memory accesses. As such, pipelining may be utilized to fetch multiple commands in parallel to hide the latency of the dependent memory accesses. The fetched command C3' is transmitted by the instruction fetch unit 250 to a session identifier (ID) memory 270. The fetched command C3' may be stored in the session ID memory 270 with other commands, e.g., C123, C201, C531 and C843, that were stored before the most recent fetching but not yet executed by the microcontroller 280. It is appreciated that for increased efficiency, commands placed in the session ID memory 270 may be presented to the firmware out of order. Often, grouping commands with complementary parameters (for example, consecutive logical block addresses, or as another example, independent flash locations) such that they are executed in parallel can improve system efficiency.

In this exemplary embodiment, the session ID memory 270 may store 32 commands. However, it is appreciated that any number of commands may be stored. The microcontroller 280 may process the commands stored in the session ID memory 270 to determine and select one or more commands to be executed within a given window of time. It is appreciated that the selection of a command or commands between the commands stored in the session ID memory 270 may be done according to a selection heuristic to optimize execution time of the system, to reduce bottlenecks and/or to increase resource utilization, etc. It is appreciated that the microcontroller may select more than one command for parallel processing and execution. As such, the selection of one command is exemplary and not intended to limit the scope of the present invention.

The active command corresponding to the command identifier, e.g., C3, is de-asserted, e.g., 0, when the command C3' is executed by the microcontroller. De-asserting an active command indicates that the command corresponding to the command identifier has been executed and that the command identifier can be replaced with a new command identifier. When a new command identifier is loaded in to a port, the active command indicator is asserted once again. For example, the active command is asserted when the command identifier C2 of port 210 is loaded. Similarly, the active command indicators are asserted when the command identifiers C0 and C3 of port 220 are loaded. Accordingly, the elapsed time for the newly loaded command identifiers are reset, e.g., t2=0 of port 210, t0=0 of port 220 and t3=0 of port 220.

Meanwhile the command identifiers stored in the ports that have outstanding commands not yet executed by the microcontroller 280 age and their corresponding elapsed times are updated. For example, the elapsed times t0, t1 and t31 for command identifiers C0, C1 and C31 of port 210 are updated to t0', t1' and t31' respectively. Similarly, the elapsed times t1, t2 and t31 of command identifiers C1, C2 and C31 of port 220 may be updated to t1', t2' and t31' respectively. Accordingly, the process repeats itself until all the issued commands are executed by the microcontroller 280.

According, a constant stream of command identifiers are repeatedly selected to form a subset of command identifiers. The commands associated with the subset of command identifiers are fetched and processed by the microcontroller to determine an efficient order of their execution. As such, a subset of commands are being execution ordering processed at the same time instead of processing all the issued commands, thereby improving efficiency. The selection of a subset of commands for execution ordering processing balances a tradeoff between optimization and fairness between commands from different ports. Moreover, slice execution and subset selection described above allow multiple commands to be pipelined and/or executed simultaneously on independent hardware systems. As such, full performance of a flash may be extracted.

Figure 3:
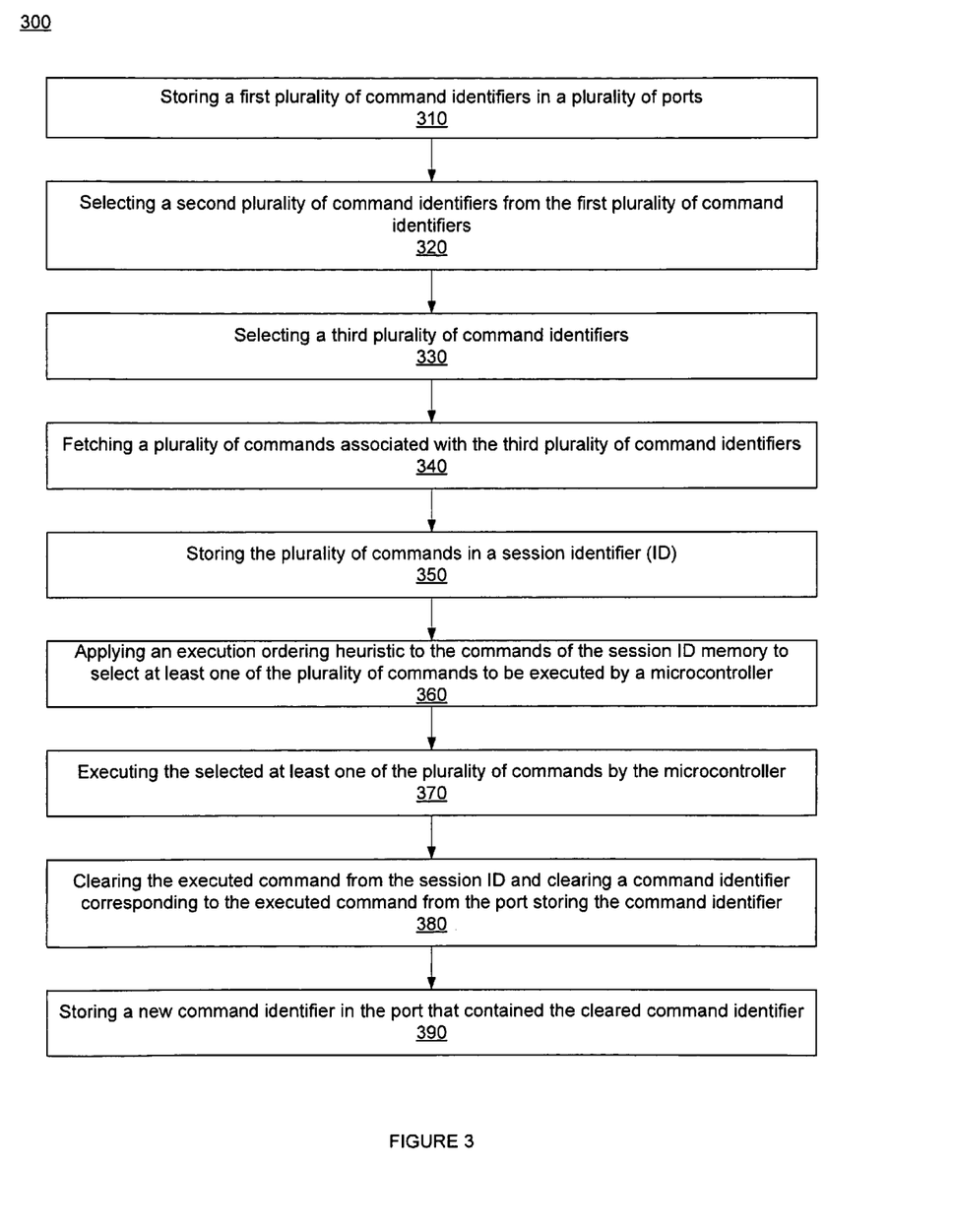
FIG. 3 shows an exemplary flow diagram in accordance with one embodiment of the present invention.

FIG. 3 shows an exemplary flow diagram 300 in accordance with one embodiment of the present invention. At step 310, a first plurality of command identifiers is stored in vacant slots of a plurality of ports. It is appreciated that each port has a corresponding arbiter. It is further appreciated that each command identifier is associated with a command issued to firmware of a flash controller.

At step 320, a second plurality of command identifiers is selected from the first plurality of command identifiers. It is appreciated that the selection of a command identifier from each port is performed by its corresponding arbiter. In one exemplary embodiment, the command identifier is selected based on its age. For example, the command identifier selected may be the oldest command identifier, thus the first command identifier loaded in the port with respect to other command identifiers within the same port.

At step 330, a secondary level arbiter may select between the second plurality of command identifiers to form a third plurality of command identifiers. It is appreciated that the secondary level arbiter may be different than the arbiters associated with each of the ports. Accordingly, a subset of the second plurality of command identifiers is selected and formed. It is appreciated that the selection of the third plurality of command identifiers by the second level arbiter may be based on the respective age of the command identifiers, the priority of the ports to which the command identifiers belong and/or any combination thereof.

At step 340, commands associated with the third plurality of command identifiers may be fetched. For example, an instruction fetch unit may be used to fetch the commands associated with the third plurality of command identifiers. The commands may be fetched from a memory component. At step 350, the fetched instructions may be stored in a session ID memory.

At step 360, a microcontroller applies an execution ordering heuristic to process the commands stored in the session ID memory to select at least one command for execution. It is appreciated that the selection of a command for execution may be based on optimizing execution time, reducing bottleneck and/or increasing resource utilization, etc. Moreover, it is appreciated that more than one command may be selected and executed in parallel, e.g., 10 commands from the session ID memory may be selected. At step 370, the selected command or commands by the microcontroller are executed by the microcontroller.

At step 380, in response to the command executed by the microcontroller, the command corresponding to the executed command stored in the session ID memory is cleared. Moreover, the command identifier stored in a port that is associated with the executed command may also be cleared. At step 390, in response to the clearing of the command identifier from the port, a new command identifier may be loaded in to the port. In other words, a new command identifier associated with a new issued command from a flash storage may be loaded in the location of the port that used to store the command identifier associated with the executed command. Therefore, a new command identifier may replace the command identifier associated with the executed command.

According, a constant stream of command identifiers are repeatedly selected to form a subset of command identifiers. The commands associated with the subset of command identifiers are fetched and processed by the microcontroller to determine the order of their execution. As such, a subset of commands are being execution ordering processed at the same time instead of execution ordering processing all the issued commands, thereby improving efficiency of firmware with limited resources. The selection of a subset of commands balances a tradeoff between optimization and fairness between commands from different ports.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A system for selecting flash storage commands comprising:
   a plurality of ports operable to store a first plurality of command identifiers;
   a first plurality of arbiters associated with said plurality of ports, wherein each of said first plurality of arbiters is operable to select a particular command identifier among command identifiers within each corresponding port based on age, wherein selection of said particular command identifier of each port results in a second plurality of command identifiers;
   a second arbiter operable to select from said second plurality of command identifiers based on ages of said second plurality of command identifiers;
   a memory operable to store fetched commands associated with command identifiers selected by said second arbiter to form a third plurality of commands; and
   a controller operable to apply a selection heuristic to said third plurality of commands to select a command.

2. The system as described in claim 1, wherein said second arbiter is operable to select based on a priority of said plurality of ports.

3. The system as described in claim 1, wherein said controller is further operable to execute said command selected by said heuristic.

4. The system as described in claim 3, wherein said controller is operable to clear said command from said memory after execution thereof.

5. The system as described in claim 1, wherein said controller after executing said command is operable to cause a command identifier associated with said executed command to be cleared from a port storing said command identifier.

6. The system as described in claim 5, wherein said first plurality of arbiters selects an oldest command identifier among command identifiers stored in each of said plurality of ports resulting in said second plurality of command identifiers, and wherein a selection by said second arbiter comprises an oldest command identifier among said second plurality of command identifiers.

7. The system as described in claim 1 further comprising:
   an instruction fetch unit operable to fetch commands selected by said second arbiter and store them into said memory.

8. A method of selecting flash commands, said method comprising:
- storing a first plurality of command identifiers in a plurality of ports, wherein said plurality of ports is associated with a first plurality of arbiters;
- selecting an oldest command identifier from each port of said plurality of ports, wherein said selecting results in a second plurality of command identifiers;
- selecting a third plurality of command identifiers from said second plurality of command identifiers based on an oldest command identifier of said second plurality of command identifiers;
- storing a plurality of commands associated with said third plurality of command identifiers within a memory; and
- applying an execution ordering heuristic to said commands stored in said session memory to select at least one executable command.

9. The method as described in claim 8 further comprising:
- executing said at least one executable command by a controller.

10. The method as described in claim 8, wherein said selecting said oldest command identifier from each port of said plurality of ports is performed by said first plurality of arbiters.

11. The method as described in claim 8, wherein said selecting said third plurality of command identifiers is performed by a second arbiter different from said first plurality of arbiters.

12. The method as described in claim 8 further comprising:
- using a fetching unit to fetch said plurality of commands from a memory component based on said third plurality of command identifiers.

13. The method as described in claim 8, wherein said selecting said third plurality of command identifiers is further based on a priority of said plurality of ports.

14. The method as described in claim 8 further comprising:
- clearing said executable command from said memory after execution thereof by a controller; and
- in response to said clearing, storing a new command identifier in a location within a port that corresponds to a command identifier associated with said executable command.

15. A method of selecting commands, said method comprising:
- selecting a first plurality of command identifiers from a plurality of ports, wherein each of said first plurality of command identifiers is an oldest issued command identifier within each of said plurality of ports;
- selecting a second plurality of command identifiers from said first plurality of command identifiers, wherein said second plurality of command identifiers is selected based on ages of said first plurality of command identifiers and based on port priorities corresponding to said first plurality of command identifiers;
- storing a plurality of commands associated with said second plurality of command identifiers in to a memory; and
- applying an execution ordering process to said plurality of commands to select at least one command from said plurality of commands for execution by a controller.

16. The method as described in claim 15 further comprising:
- executing said at least one command by said controller.

17. The method as described in claim 15 further comprising:
- prior to said storing, fetching said plurality of commands from a memory component based on said second plurality of command identifiers.

18. The method as described in claim 15 further comprising:
- clearing a command identifier in a port within said plurality of ports, wherein said command identifier corresponds to a command executed by said controller.

19. The method as described in claim 18 further comprising:
- in response to said clearing, storing a new command identifier in said port.

20. The method as described in claim 15, wherein said selecting said first plurality of command identifiers is performed by a first plurality of arbiters, and wherein selecting said second plurality of command identifiers is performed by a second arbiter coupled to said first plurality of arbiters.

21. The method as described in claim 15, wherein said execution ordering process attempts to optimize execution time of said controller.

* * * * *